(12) United States Patent
Shad (10) Patent No.: US 9,001,926 B2
(45) Date of Patent: Apr. 7, 2015

(54) COMMON MODE SIGNAL REDUCTION IN POWERLINE COMMUNICATION DEVICES

(75) Inventor: Faisal M. Shad, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 13/564,558

(22) Filed: Aug. 1, 2012

(65) Prior Publication Data

US 2014/0036976 A1  Feb. 6, 2014

(51) Int. Cl.
*H04B 3/54* (2006.01)

(52) U.S. Cl.
CPC ........ *H04B 3/542* (2013.01); *H04B 2203/5416* (2013.01); *H04B 2203/5425* (2013.01); *H04B 2203/5495* (2013.01)

(58) Field of Classification Search
CPC .................................. H04B 3/54; H04B 3/544
USPC .................................................. 375/295–297
See application file for complete search history.

(56) References Cited

U.S. PATENT DOCUMENTS

| | | | |
|---|---|---|---|
| 7,430,291 B2 | 9/2008 | Washburn et al. | |
| 2006/0187004 A1 | 8/2006 | Vollmer et al. | |
| 2008/0064359 A1* | 3/2008 | Yamaji et al. | 455/341 |
| 2008/0107242 A1* | 5/2008 | Ichihara et al. | 379/1.03 |
| 2008/0199001 A1 | 8/2008 | Young | |
| 2010/0102900 A1 | 4/2010 | Poveda Lerma et al. | |
| 2011/0206140 A1 | 8/2011 | Schwager et al. | |
| 2012/0063173 A1 | 3/2012 | Fu et al. | |

OTHER PUBLICATIONS

International Search Report and Written Opinion—PCT/US2013/052564—ISA/EPO—Nov. 4, 2013, 9 pages.
"PCT Application No. PCT/US2015/014163 International Preliminary Report on Patentability", Feb. 12, 2015, 6 pages.

* cited by examiner

*Primary Examiner* — Kevin Kim
(74) *Attorney, Agent, or Firm* — DeLizio Gilliam, PLLC (57) ABSTRACT

An active common mode current limiting mechanism limits common mode currents in a powerline communication device. A powerline coupler determines a common mode signal component of an output signal of the powerline communication device. The powerline coupler provides voltage estimates of the common mode signal component to a signal processing unit. The signal processing unit generates samples of the voltage estimates of the common mode signal component. The signal processing unit adjusts transmit voltage levels of the powerline communication device based on the samples of the voltage estimates of the common mode signal component to limit the common mode signal component of the output signal.

31 Claims, 9 Drawing Sheets

COMMON MODE SIGNAL REDUCTION IN POWERLINE COMMUNICATION DEVICES

BACKGROUND

Embodiments of the inventive subject matter generally relate to the field of communication networks, and, more particularly, to reducing common mode currents in powerline communication devices.

Powerline communication (PLC) is a wired communication technology that utilizes electrical power wiring for transmitting and receiving communication signals. PLC technology typically utilizes a powerline communication device to facilitate communication between electronic/electric devices (e.g., Computer, Washing Machine, Door Lock, Electric Motor, etc.). In a balanced PLC network, electrical currents of equal magnitude (differential mode currents) travel in opposite directions over the line and neutral wires. However, PLC devices often have an imbalance in the currents which travel through the line and neutral wires. The imbalance in currents may be due to variations in the impedance parameters, S-parameters, wire thicknesses, etc. This imbalance manifests itself as common mode currents which travel through the line and neutral wires in the same direction, and then return through a ground path (a path different from a protective earth wire). The imbalance in current between the line and neutral wires is mitigated somewhat by a coupling transformer. However, due to parasitic capacitances and non-ideal behavior, some of the common mode currents also couple through the transformer. Electromagnetic fields which are radiated by differential mode currents tend to be 180 degrees out-of-phase with respect to each other, and hence they cancel out. However, electromagnetic fields generated by common mode currents are in-phase and do not cancel out. The electromagnetic fields generated by common mode currents may result in electromagnetic emissions outside permissible range.

SUMMARY

Various embodiments are disclosed of mechanisms for limiting common mode currents in a powerline communication device. In one embodiment, common mode signal components of an output signal of a powerline communication device are determined using a feedback loop. Voltage estimates of the common mode signal component are provided to a signal processing unit of the powerline communication device. Samples of the voltage estimates of the common mode signal component are generated by the signal processing unit. Transmit voltage levels of the powerline communication device are adjusted based on the samples of the voltage estimates of the common mode signal component to limit the common mode signal component of the output signal.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to PLC processing unit and a PLC coupler to limit common mode currents, embodiments are not so limited. In some embodiments, common mode currents may be limited by one or more units in a communication unit of a PLC device. In other instances, well-known instruction instances, protocols, structures and techniques have not been shown in detail in order not to obfuscate the description.

A PLC processing unit and a PLC coupler of a network device having PLC communication capabilities (i.e., a PLC device) can implement one or more techniques to limit common mode currents in the PLC device. For example, the PLC processing unit can limit the common mode currents by modifying the voltage levels in an output signal from a digital-to-analog converter (DAC). The PLC processing unit suppresses the common mode currents based on common mode current measurements received via a feedback loop from the PLC coupler. In another technique, the common mode currents can be limited by injecting a canceling current (in opposite direction to the common mode currents) into a protective earth wire. Limiting the common mode currents in the PLC device limits the electromagnetic emissions from the electrical wires, and hence allows transmission of stronger differential mode currents in the electrical wires for powerline communication.

In some embodiments, the PLC processing unit adjusts (e.g., reduces) the transmit voltages on the line and neutral wires in equal proportion to limit the common mode currents. The common mode currents are frequency dependent, and the PLC processing unit adjusts the transmit gain for certain carrier frequencies based on the common mode current measurements received from the PLC coupler. In other embodiments, the PLC processing unit differentially adjusts the transmit voltages on the line and neutral wires for certain carrier frequencies to limit the common mode currents. For example, a differential output DAC drives currents of unequal magnitudes on the line and neutral wires. Further, in other embodiments, an estimation unit determines estimates of a canceling current and injects the canceling current into a protective earth wire to limit the common mode currents.

Figure 1:
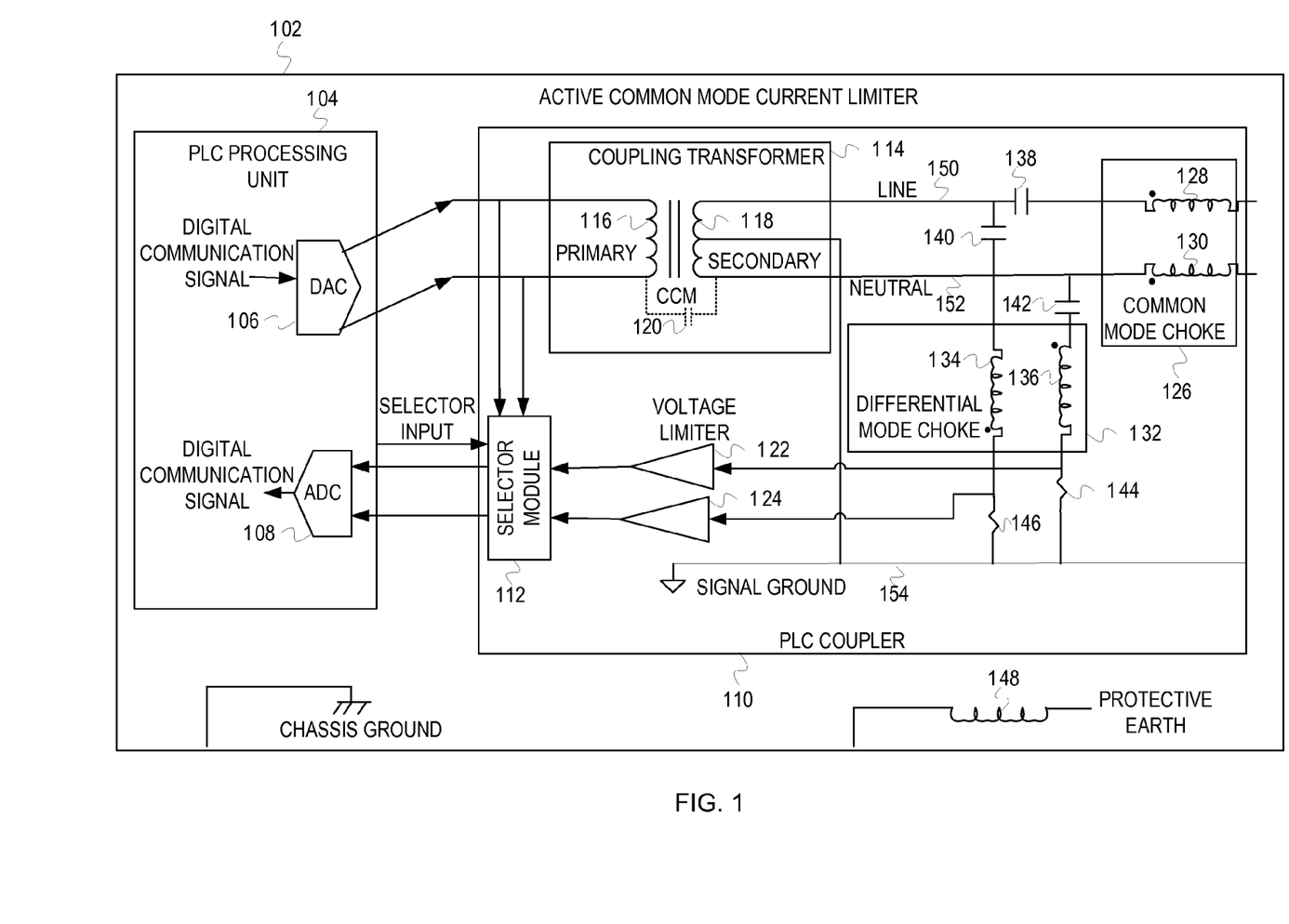
FIG. 1 depicts an example conceptual diagram of an active common mode current limiter to limit common mode currents in a PLC device.

FIG. 1 depicts an example conceptual diagram of an active common mode current limiter to limit common mode currents in a PLC device. FIG. 1 includes an active common mode current limiter 102 having a PLC processing unit 104 and a PLC coupler 110. The active common mode current limiter 102 limits common mode currents by reducing voltage levels at the output of the PLC processing unit 104 based on common mode current measurements received from the PLC coupler 110. In some embodiments, the PLC processing unit 104 and the PLC coupler 110 may be part of a PLC device; for example, the PLC device may be a network device with PLC communication capabilities (and potentially other communication technologies), such as a desktop computer, digital video recorder DVR), television, smart appliance, etc. The PLC processing unit 104 includes an analog-to-digital converter (ADC) 108 (e.g., a direct conversion ADC, a successive approximation ADC, etc.) and a DAC 106 (e.g., a pulse width modulator, a binary-weighted DAC, etc.). The DAC 106 converts an orthogonal frequency division multiplexing (OFDM) signal to an analog signal for transmission on electrical wires (e.g., a line wire and a neutral wire). The ADC 108 converts an analog signal(s) received from the PLC coupler 110 to a digital signal(s) to be processed by one or more components of the PLC processing unit 104. For simplification, FIG. 1 does not depict all components of the PLC processing unit 104. In some implementations, the active common mode current limiter 102 is coupled to a chassis ground (which acts as a sink for extraneous currents). The active common mode current limiter 102 may also be coupled to a protective earth wire (e.g., a protective earth wire in a powerline plugin module) via an inductor 148.

The PLC coupler 110 includes a coupling transformer 114, a selector module 112 (e.g., a selector module switch), a voltage limiter 122 (e.g., a linear series regulator, a switching regulator, etc.), a voltage limiter 124, a line wire 150, a neutral wire 152, a signal ground 154, a differential mode choke 132, and a common mode choke 126. The coupling transformer 114 includes a primary winding 116, and a secondary winding 118. It is noted that the common mode currents are not transferred from a primary winding to a secondary winding in an ideal coupling transformer as there is no contribution to the potential difference across the primary winding from the common mode voltage. However, in actual transformer implementations, a small capacitance is likely to be present from the primary winding to the secondary winding. FIG. 1 depicts the coupling capacitance CCM 120 present between the primary winding 116 and the secondary winding 118. The primary winding 116 is coupled to the DAC 106, and receives the analog signal to be coupled to the line wire 150 and the neutral wire 152 for transmission. The terminals of the primary winding 116 are also coupled to the selector module 112, which feeds the received signal (i.e., the differential signal received over the line wire 150 and the neutral wire 152) coupled from the secondary winding 118. The terminals of the secondary winding 118 are coupled to the line wire 150 and the neutral wire 152. A center tap from the secondary winding 118 is also coupled to the signal ground 154 to provide a return path for the common mode currents. The input terminals of the differential mode choke 132 are coupled to the line wire 150 via a capacitor 140, and to the neutral wire 152 via a capacitor 142. The capacitor 140 and the capacitor 142 direct the high frequency components of the differential signal at the output terminals of the secondary winding 118 to the differential mode choke 132. The differential mode choke 132 includes a winding 134 coupled to the line wire 150, and a winding 136 coupled to the neutral wire 152. The windings 134 and 136 in the differential mode choke 132 are in opposite directions and block the differential mode currents from the differential signal on the line wire 150 and the neutral wire 152. It is noted that the differential mode choke 132 is coupled to the line wire 150, and the neutral wire 152 before the differential signal is fed into the common mode choke 126 and hence estimates of the common mode current (i.e., the common mode current component of the differential signal which exits from the PLC coupler 110) can be obtained.

In one implementation, the differential mode choke 132 allows voltage measurements across the line wire 150 to the signal ground 154, and the neutral wire 152 to the signal ground 154, respectively. Resistors 144 and 146 provide a low resistance path to the signal ground 154, such that majority of the current flows through the differential mode choke 132, and relatively little current is injected into the common mode choke 126 due to high impedance of the common mode choke 126 at operating frequencies (e.g., frequencies above 2 MHz for broadband PLC devices). The common mode choke 126 includes a winding 128 coupled to the line wire 150 via a capacitor 138, and a winding 130 coupled to the neutral wire 152. The windings 128 and 130 in the common mode choke 126 are in the same direction, which limit common mode currents at the output of the active common mode current limiter 102. For example, the common mode choke 126 aids in limiting common mode currents which are not limited by the PLC processing unit 104 in the active common mode current limiter 102.

In one implementation, the voltage limiters 122 and 124 receive the output signals from the differential mode choke 132. The voltage limiters 122 and 124 amplify or attenuate the voltages in the output signals to be within the dynamic range of the ADC 108. The selector module 112 receives two sets of signals, a differential signal from the primary winding 116 and a signal pair from the voltage limiters 122 and 124, respectively, which is related to the common mode signal component. The differential signal from the primary winding 116 is a signal received over the line wire 150 and the neutral wire 152, which is coupled from the secondary winding 118 to the primary winding 116. The signals from the voltage limiters 122 and 124 represent voltages (of the common mode signal component) at the output of differential mode choke 132. The selector module 112 is digitally controlled by one or more components of the PLC processing unit 104, and it selects a signal set to be fed to the ADC 108. For example, the selector module 112 selects the differential signal from the primary winding 116 when the PLC processing unit 104 is in a receive mode, and the selector module 112 selects the signals from the voltage limiters 122 and 124 when the PLC processing unit 104 is in a transmit mode or a training mode.

In some implementations, during the transmit mode or the training mode, the DAC 106 is actively transmitting and the primary winding 116 couples the differential signal at the output of the DAC 106 to the secondary winding 118. The output of the differential mode choke 132 is the common mode signal component which is coupled to the line wire 150 and the neutral wire 152 from the secondary winding 118. The voltage limiters 122 and 124 amplify or attenuate the voltages of the output signals from the differential mode choke 132, and the selector module 112 selects the signals from the voltage limiters 122 and 124 during the training mode. The ADC 108 samples the voltages (of the common mode signal component) received from the selector module 112 at an appropriate sampling rate and resolution. The ADC 108 subsequently supplies the sampled voltages to one or more components in the PLC processing unit 104. The components in the PLC processing unit 104 determine the voltage levels as a function of the frequency of the common mode signal component. For frequencies where the voltage levels in the common mode signal component are sufficiently high, such that there is large probability of exceeding the radiated emissions limits, one or more components in the PLC processing unit 104 adjusts the differential mode voltage gains of the corresponding OFDM carrier frequencies. For example, a multiplier in the PLC processing unit 104 reduces the amplitude levels of quadrature amplitude modulation (QAM) symbols corresponding to a particular OFDM carrier frequency. A reduction in the differential mode voltage gain at the PLC processing unit 104 reduces the differential mode current at the output of the DAC 106. The common mode currents on the line wire 150 and the neutral wire 152 also reduce as a result of reduction in the differential mode current, since the common mode current is directly proportional to the differential mode current (related by a longitudinal conversion loss ratio).

The active common mode current limiter 102 may utilize a single iteration or multiple iterations, to adjust the transmit gain at one or more components (e.g., amplifier, modulator, etc.) in the PLC processing unit 104 based on a target limit for common mode currents (and hence electromagnetic emissions as a result of the common mode currents), as will be further described below with reference to FIGS. 2-5. It is noted that, in some implementations, the ADC 108 is electrically isolated from the transmit path (from the DAC 106), which could otherwise saturate a receiver in the PLC processing unit 104 as the measured common mode signal component voltage is expected to be much lower than the injected differential mode signal component voltage. The selector module 112 allows the PLC processing unit 104 to achieve an electrical isolation between the transmit path and the receive path. In some implementations, a separate ADC (separate from the ADC 108) may be utilized for the purpose of sampling the common mode signal component. Since common mode currents are frequency dependent, the sampling rate of the ADC 108 is typically at least twice the maximum bandwidth of the differential signal at the output of the DAC 106. The resolution of the ADC 108 is also sufficient to provide a dynamic range (e.g., 50 dBs), to measure a broad range of levels of the common mode signal component.

In some embodiments, to measure a common mode current at a higher signal level relative to ambient noise and a differential mode current, the common mode current may be amplified with respect to the differential mode current. Amplifying the common mode current relative to the differential mode current allows the use of one or more components in the PLC coupler 110 with greater error tolerances and measuring very low current values. In one implementation, the common mode current amplification can be achieved by digitally activating a coupling capacitor(s) (e.g., the coupling capacitor CCM 120) to allow a common mode signal component to bridge across from the primary winding 116 to the secondary winding 118. It is noted, that the capacitance of the coupling capacitor(s) is set such that the series impedance of the coupling capacitor(s) is relatively small in comparison with the resistor 144, the resistor 146, and the common mode impedance of the common mode choke 126. The coupling capacitor (s) are typically activated for a few tens of microseconds which is lower than the charge time constant of a quasi-peak detector utilized for measuring radiated emissions.

In some embodiments, the PLC processing unit 104 utilizes a calibration table which relates the common mode signal component measured at the PLC processing unit 104 to common mode current measurements obtained using a high fidelity instrument (e.g., a commercial spectrum analyzer with a quasi-peak detector). The PLC processing unit 104 utilizes the calibration table to take into account variations in measurements due to sampling rates, component manufacturing tolerances, amplifier noise figures, etc. The calibration table can be loaded into a firmware at the PLC processing unit 104. One or more components in the PLC processing unit 104 utilize the calibration table to apply a correction to the common mode signal component voltages sampled by the ADC 108. When utilizing the high fidelity instrument for measurement purposes, the coupling capacitor(s) to amplify the common mode current relative to the differential mode current (as described above) are deactivated.

Figure 2A:
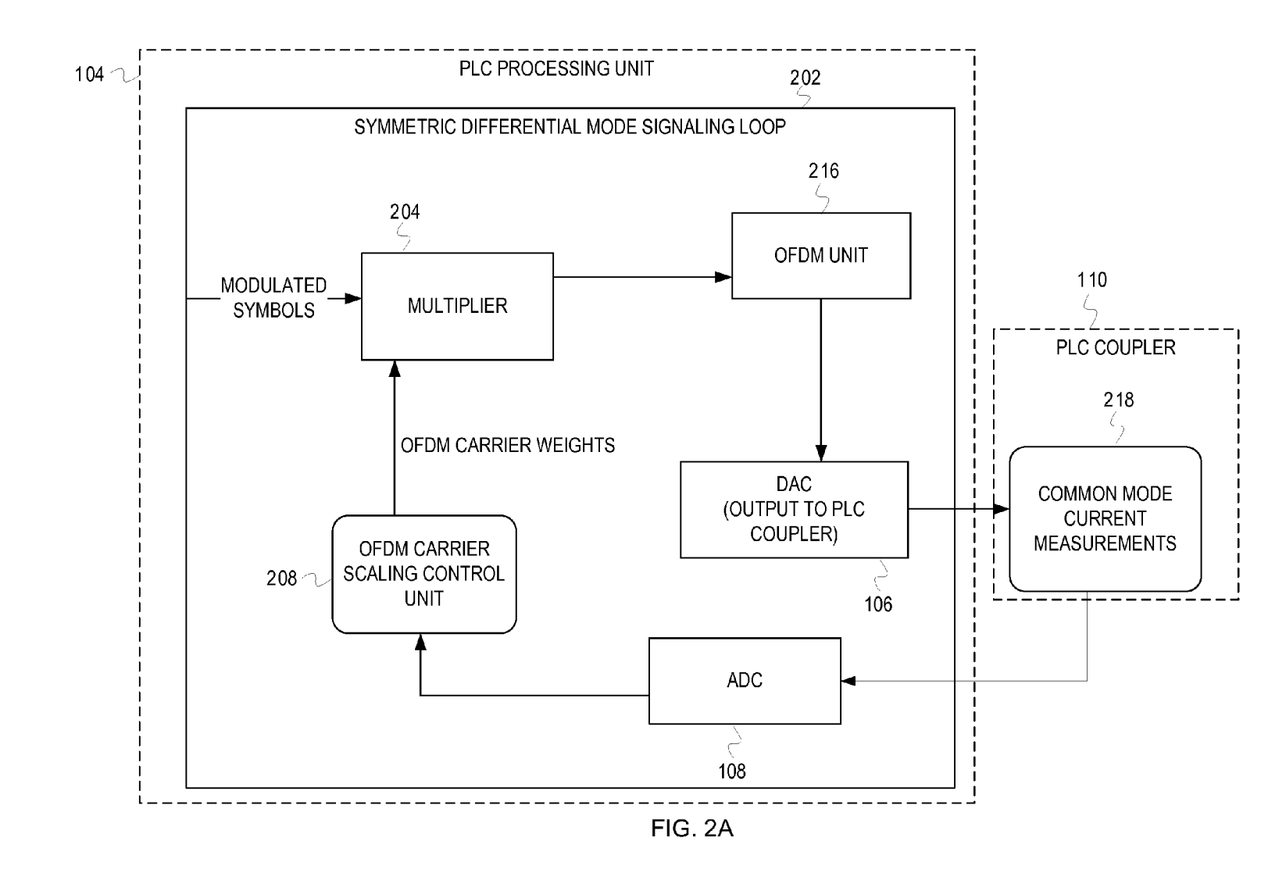
FIG. 2A depicts an example conceptual diagram of a symmetric differential mode signaling control loop to adjust transmit voltage levels in a PLC processing unit.

FIG. 2A depicts an example conceptual diagram of a symmetric differential mode signaling control loop to adjust transmit voltage levels in a PLC processing unit. FIG. 2A includes the PLC processing unit 104 and the PLC coupler 110 as described above with reference to FIG. 1. The PLC processing unit 104 includes a symmetric differential mode signaling loop 202 having a multiplier 204, an OFDM carrier scaling control unit 208, an OFDM unit 216, the ADC 108 and the DAC 106. For simplification, FIG. 2A does not depict all components of the PLC processing unit 104 and the PLC coupler 110. The PLC coupler 110 includes common mode current measurements 218. The common mode current measurements 218 are obtained based on the common mode currents on the line and neutral wires in the PLC coupler 110 (e.g., based on the operations described above in FIG. 1). The common mode current measurements 218 may be obtained using a current probe, a digital common mode current meter (utilizing a digital non-inverting adder), etc. For example, the current probe may be located inside the PLC coupler 110 to measure common mode currents at line and neutral wires. In some implementations, when the common mode current probe has a large form factor, the common mode current probe may be located outside the PLC coupler 110.

In one implementation, the multiplier 204 may be a binary multiplier and receives modulated symbols and OFDM carrier weights as inputs. In some implementations, the multiplier 204 may be a part of the OFDM unit 216. The modulated symbols include symbols modulated using a modulation technique (e.g., QAM, etc.) for data to be transmitted over the line and neutral wires. The OFDM carrier weights are values generated using the OFDM carrier scaling control unit 208. The OFDM carrier scaling control unit 208 may include program instructions to compute the OFDM carrier weights, which when multiplied with the modulated symbols adjust the transmit voltage levels in the PLC processing unit 104 to limit common mode currents below a threshold level (e.g., as described further below at block 258 in FIG. 2B). The OFDM carrier scaling control unit 208 utilizes voltage samples of a common mode signal component received from the ADC 108 to generate the OFDM carrier weights. The ADC 108 receives the common mode signal component from the common mode current measurements 218 via a feedback loop (e.g., the feedback loop of the PLC coupler 110), and determines voltage samples for the common mode signal component (e.g., as described at block 256 in FIG. 2B). The common mode current measurements 218 are measurements for common mode currents on the line and neutral wires in the PLC coupler 110. The adjusted modulated symbols (at the output of the multiplier 204) are fed to the OFDM unit 216. The OFDM unit 216 includes one or more components (e.g., an inverse fast Fourier transform unit, a time domain windowing unit, etc.) to generate an OFDM signal. The DAC 106 receives the output of the OFDM unit 216 and generates analog signals for the OFDM signals. The PLC coupler 110 receives the analog signals from the DAC 106 for transmission on the line and neutral wires.

In one implementation, the OFDM carrier scaling control unit 208 generates OFDM carrier weights for each of the carrier frequencies for which transmit voltage levels are to be adjusted. In some implementations, the OFDM carrier scaling control unit 208 may include signal processing components to determine voltage samples for each of the carrier frequencies based on the voltage samples received from the ADC 108. For simplification, FIG. 2A only depicts a single multiplier 204. However, multiple multipliers may be utilized for multiplying the OFDM carrier weights with modulated symbols for each of the carrier frequencies (e.g., see FIG. 3).

The symmetric differential mode signaling loop 202 described in FIG. 2A iteratively calculates the OFDM carrier weights in real time to adjust the transmit voltage levels of signals at the output of the PLC processing unit 104. The symmetric differential mode signaling loop 202 depicts one implementation of reducing transmit voltage levels at the output of the DAC 106 in the active common mode current limiter 102 as described above with reference to FIG. 1. With iterative calculations of the OFDM carrier weights, the symmetric differential mode signaling loop 202 allows optimization of the OFDM carrier weights to mitigate errors resulting from noise and variations in device performance due to environmental conditions.

It is noted that, in some implementations, the active common mode current limiter 102 may not necessarily utilize the OFDM carrier weights calculated iteratively, but certain stored values of the OFDM carrier weights. Also, the active common mode current limiter 102 may utilize average values of the OFDM carrier weights previously determined by the OFDM carrier scaling control unit 208.

Figure 2B:
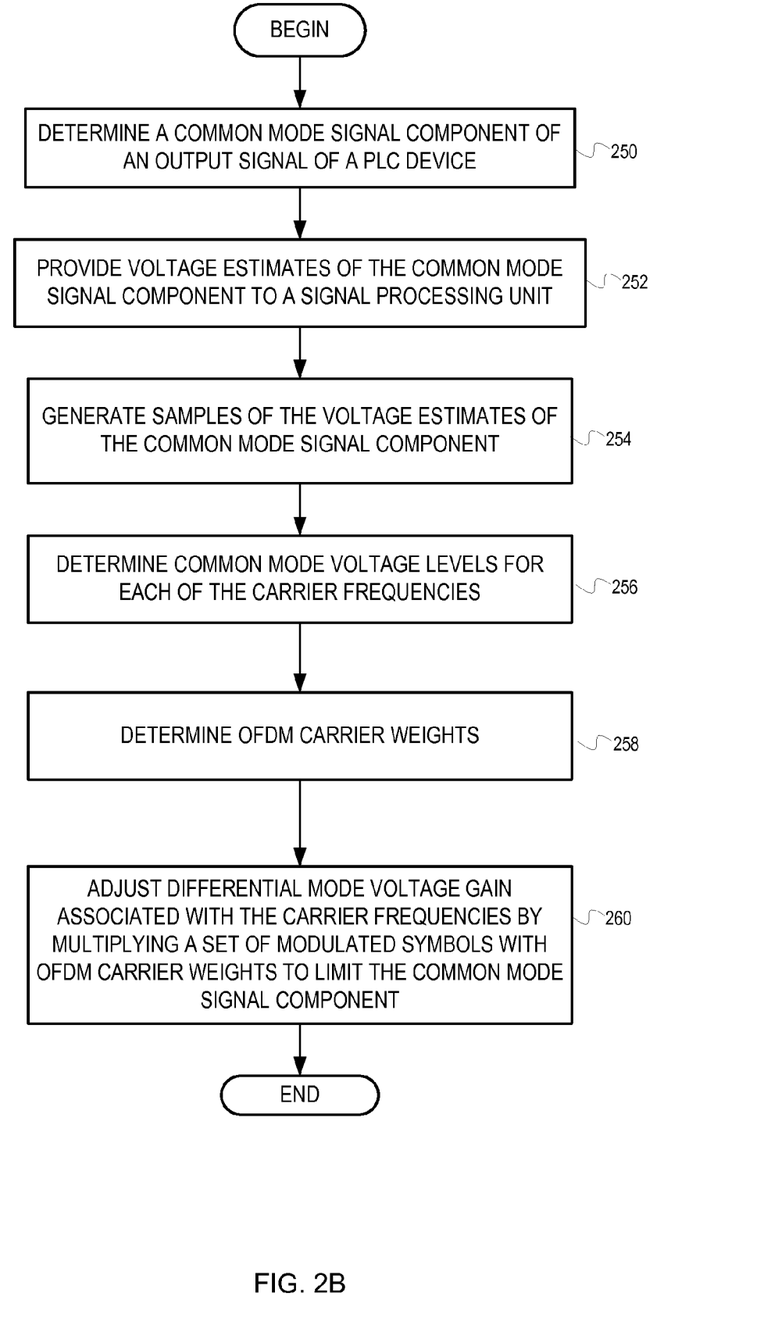
FIG. 2B illustrates a flow diagram of example operations to adjust transmit voltage levels using a symmetric differential mode signaling control loop.

FIG. 2B illustrates a flow diagram ("flow") of example operations to adjust transmit voltage levels using a symmetric differential mode signaling control loop of a PLC device. The flow begins at block 250.

At block 250, a common mode signal component of an output signal of a PLC device is determined. In one implementation, a PLC coupler 110 of the PLC device determines a common mode current signal component using the feedback loop, as described above with reference to FIGS. 1 and 2A. The flow continues at block 252.

At block 252, voltage estimates of the common mode signal component are provided to a signal processing unit. In one implementation, the PLC coupler 110 provides voltage estimates of the common mode signal component to the ADC 108 in the PLC processing unit 104. For example, the PLC coupler 110 may provide the common mode current measurements 218 to the ADC 108 in the PLC processing unit 104. The flow continues at block 254.

At block 254, samples of the voltage estimates of the common mode signal component are generated. In one implementation, the ADC 108 generates samples of the voltage estimates of the common mode signal component received from the PLC coupler 110. The flow continues at block 256.

At block 256, common mode voltage levels are determined for each of the carrier frequencies. In one implementation, the OFDM carrier scaling control unit 208 of the PLC processing unit 104 determines the common mode voltage levels for each of the carrier frequencies utilized for communication. The flow continues at block 258.

At block 258, OFDM carrier weights are determined. In one implementation, the OFDM carrier scaling control unit 208 determines OFDM carrier weights for the carrier frequencies. The OFDM carrier scaling control unit 208 may determine OFDM carrier weights to increase or decrease a differential mode voltage gain for certain carrier frequencies. The OFDM carrier scaling control unit 208 may also determine OFDM carrier weights such that the differential mode voltage gain is not adjusted (i.e., the gain is maintained) for certain carrier frequencies. In one implementation, the OFDM carrier scaling control unit 208 determines OFDM carrier weights to maximize transmit power of OFDM signals while keeping common mode currents within a certain threshold limit (to limit electromagnetic emissions). After determining the OFDM carrier weights, the OFDM carrier scaling control unit 208 sends the OFDM carrier weights to the multiplier 204. The flow continues at block 260.

At block 260, differential mode voltage gain associated with the carrier frequencies is adjusted by multiplying OFDM carrier weights with a set of modulated symbols in order to limit the common mode signal component to an acceptable level. In one implementation, the multiplier 204 multiplies the OFDM carrier weights with the set of modulated symbols to adjust the differential mode voltage gain associated with the carrier frequencies in order to limit the common mode signal component. After OFDM operations at the OFDM unit 216, the adjusted signals are provided to DAC 106 to covert to analog form before sending the adjusted signals to the PLC coupler 110. In some implementations, one or more iterations of this process may be performed by the PLC processing unit 104 and the PLC coupler 110 in order to further limit the common mode signal component of the output signal of the PLC device. After block 260, the flow ends.

Figure 3:
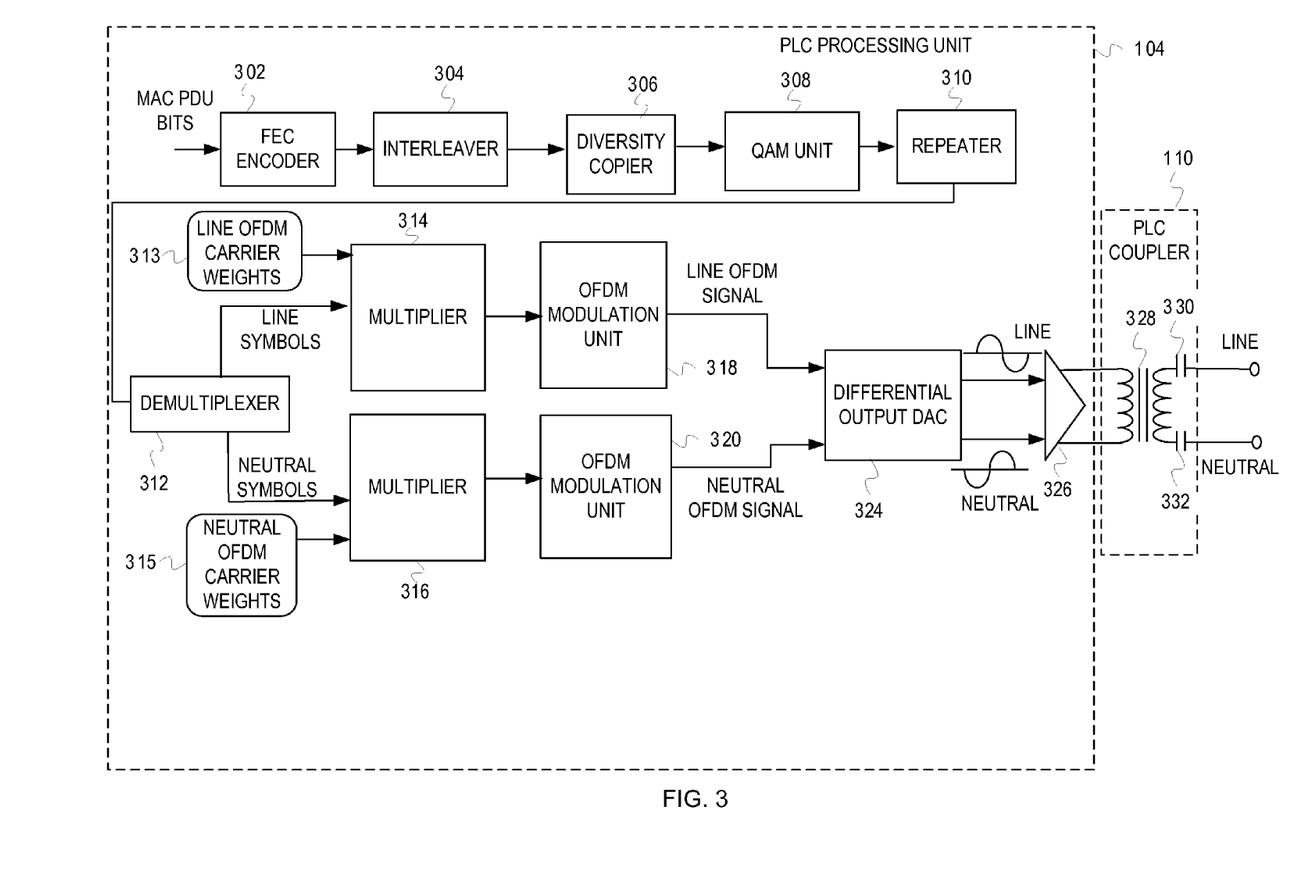
FIG. 3 depicts an example conceptual diagram of a PLC processing unit utilizing a differential output digital-to-analog converter to limit common mode currents in a PLC device.

FIG. 3 depicts an example conceptual diagram of a PLC processing unit utilizing a differential output digital-to-analog converter to limit common mode currents in a PLC device. FIG. 3 includes the PLC processing unit 104 and the PLC coupler 110 as described above with reference to FIG. 1. FIG. 3 depicts a technique to limit the common mode currents using a differential DAC in the active common mode current limiter 102. As illustrated, in some embodiments, the PLC processing unit 104 includes a forward error correction (FEC) encoder 302 (e.g., a BCH encoder, a turbo encoder, etc.), an interleaver 304 (e.g., a rectangular interleaver, etc.), a diversity copier 306, a QAM unit 308, a repeater 310 (e.g., a 1:2 repeater), a de-multiplexer 312, line OFDM carrier weights 313, neutral OFDM carrier weights 315, a multiplier 314 (e.g., a binary multiplier), a multiplier 316, an OFDM unit 318, an OFDM unit 320, a differential output DAC 324, and an amplifier 326 (e.g., a programmable gain amplifier, etc.). The PLC coupler 110 includes a coupling transformer 328 with its primary winding coupled to the amplifier 326. The secondary winding of the coupling transformer 328 is coupled to a line wire and a neutral wire via a coupling capacitor 330 and a coupling capacitor 332, respectively. For simplification, FIG. 3 does not depict all components of the PLC coupler 110 and the PLC processing unit 104.

In one implementation, the FEC encoder 302 encodes bits in a media access control (MAC) protocol data unit (PDU) to implement error detection and correction, and sends the encoded output to the interleaver 304. The interleaver 304 rearranges the encoded output (e.g., using bit-interleaving, etc.) and sends the output to the diversity copier 306 which creates copies of data bits based on the number of carrier frequencies enabled for powerline communication. The QAM unit 308 generates QAM symbols for the data bits received from the diversity copier 306. The repeater 310 is typically a 1:2 signal repeater and replicates the QAM symbols into two identical streams. The de-multiplexer 312 de-multiplexes the QAM symbols into line symbols and neutral symbols for transmission on the line and neutral wires, respectively. The multiplier 314 multiplies the line symbols with the line OFDM carrier weights 313. The line OFDM carrier weights 313 are values which when multiplied with the line symbols adjust the line symbols to limit transmit voltages on the line wire (which limits the common mode currents on the line wire). Similarly, the multiplier 316 multiplies the neutral symbols with the neutral OFDM carrier weights 315. The neutral OFDM carrier weights 315 are values which when multiplied with the neutral symbols adjust the neutral symbols to set transmit voltages on the neutral wire (which affects the common mode currents on the neutral wire). The line OFDM carrier weights 313 and the neutral OFDM carrier weights 315 have unique values for each of the OFDM carrier frequencies. In some implementations, the multipliers 314 and 316 may be part of the OFDM units 318 and 320, respectively. In some implementations, the line symbols and the neutral symbols at the output of the de-multiplexer 312 are substantially identical streams; however, the adjusted line symbols and the adjusted neutral symbols (at the outputs of the multiplier 314 and the multiplier 316) are not identical streams. The adjusted line symbols and the adjusted neutral symbols result in a modification of the root mean square (RMS) voltages transmitted on the line and neutral wires from the PLC device. In one implementation, the line OFDM carrier weights 313 and the neutral OFDM carrier weights 315 are pre-determined and stored in a memory at the PLC processing unit 104. In other implementations, the line OFDM carrier weights 313 and the neutral OFDM carrier weights 315 may be iteratively computed by an asymmetric differential mode signaling control loop (e.g., as described in FIG. 5A). The OFDM units 318 and 320 receive the adjusted line and neutral symbols from the multipliers 314 and 316, respectively. The OFDM units 318 and 320 encode the adjusted line and neutral symbols as a line OFDM signal and a neutral OFDM signal, respectively. The differential output DAC 324 is capable of converting digital signals (i.e., the line OFDM signal and the neutral OFDM signal) having unequal RMS voltage levels into analog signals and driving them for transmission on the line and neutral wires. The amplifier 326 amplifies the output of the differential output DAC 324. In one implementation, the amplifier 326 is a programmable gain amplifier, and the gain of the amplifier 326 is controlled by one or more components in the PLC processing unit 104. As illustrated, in some embodiments, the output terminals of the amplifier 326 are coupled to a primary winding of the coupling transformer 328. The coupling transformer 328 couples a line signal and a neutral signal received from the amplifier 326 to a secondary winding. From the secondary winding, the line signal is coupled to the line wire via the coupling capacitor 330 and the neutral signal is coupled to the neutral wire via the coupling capacitor 332. The differential output DAC 324 allows limiting common mode currents when only small adjustments are applied to the individual differential mode signals on the line and neutral wires.

Figure 4:
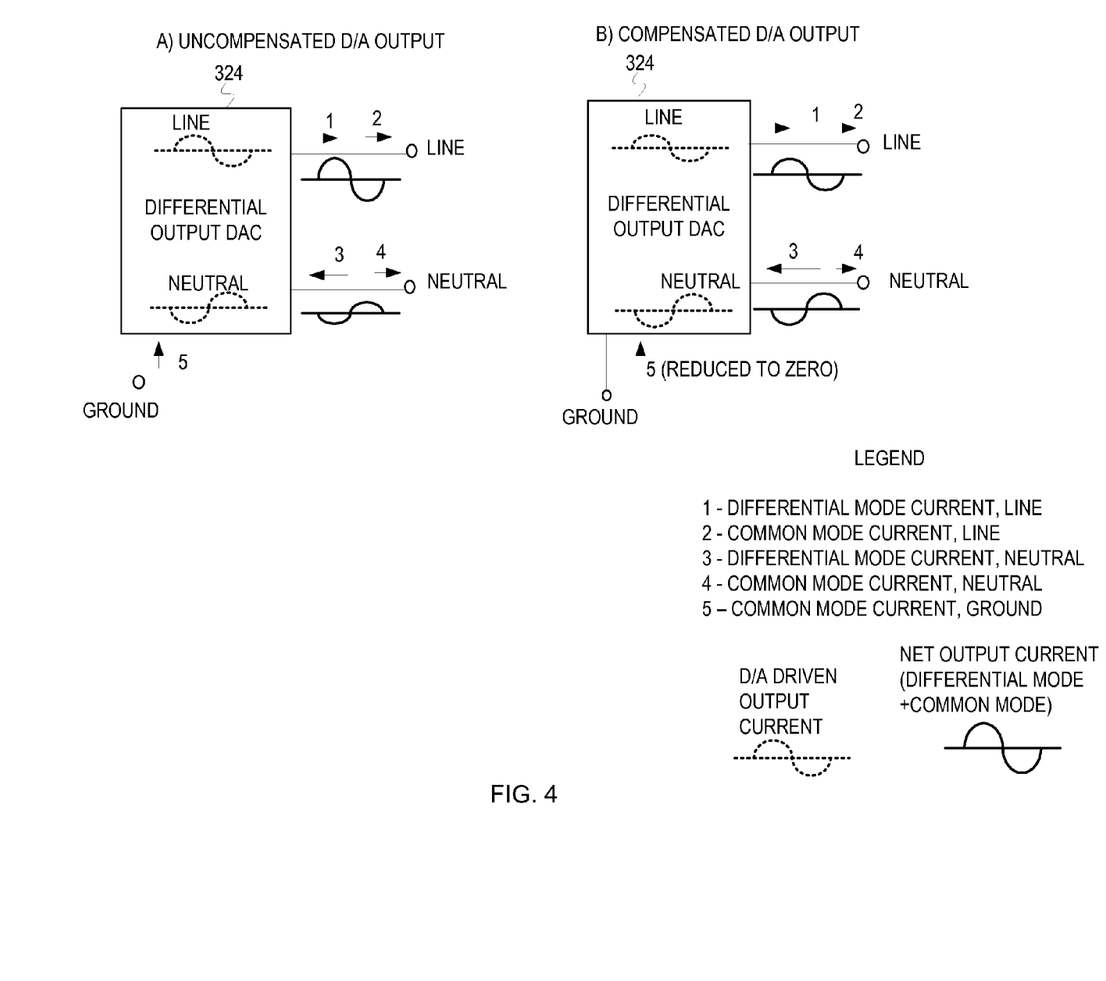
FIG. 4 depicts an example conceptual diagram of uncompensated common mode currents and compensated common mode currents at the output of a differential digital-to-analog converter.

FIG. 4 depicts an example conceptual diagram of uncompensated common mode currents and compensated common mode currents at the output of a differential digital-to-analog converter. FIG. 4 depicts the differential output DAC 324, as described above with reference to FIG. 3, in Section A and Section B. Section A represents uncompensated common mode currents at the output of the differential output DAC 324 for an OFDM carrier frequency. For example, the common mode currents in Section A are uncompensated when the line OFDM carrier weights 313 and the neutral OFDM carrier weights 315 are not utilized at the multipliers 314 and 316, respectively. Section B represents compensated output currents at the output of the differential output DAC 324 for the OFDM carrier frequency. For example, the common mode currents in Section B are compensated when the line OFDM carrier weights 313 and the neutral OFDM carrier weights 315 are utilized at the multipliers 314 and 316, respectively.

In Section A and Section B, dotted waveforms depict current waveforms for the signals driven by the differential output DAC 324 and solid waveforms depict current waveforms for signals at the output of the differential output DAC 324 (i.e., current waveforms for a net output current which is the sum of differential mode and common mode currents). The numeral 1 represents a differential mode current on the line wire, the numeral 2 represents a common mode current on the line wire, the numeral 3 represents a differential mode current on the neutral wire, the numeral 4 represents a common mode currents on the neutral wire, and the numeral 5 represents a common mode current through the ground path. The ground path provides a return path for the net common mode current on the line and neutral wires (for simplification FIG. 4 does not depict the return path). Arrows with numerals represent direction of currents, and the size of each arrow represents the magnitude of current represented by the respective numeral.

When signals having equal RMS currents are applied on the line and neutral wires, as depicted in Section A, the current 2 adds constructively with the current 1, while the current 4 adds destructively with the current 3. A constructive addition of the current 2 with the current 1 results in an increase of the RMS voltage (and hence the RMS current) on the line wire, while a destructive addition of the current 4 with the current 3 results in a decrease in the RMS voltage (and hence the RMS current) on the neutral wire. The asymmetry in voltage levels and current magnitudes at the line and neutral wires results in the current 5.

Section B depicts signals having unequal RMS currents applied on the line and neutral wires. For example, the RMS current applied on the line wire in Section B is reduced relative to the RMS current applied on the line wire in Section A. Also, the RMS current applied on the neutral wire in Section B is increased relative to the RMS current applied on the neutral wire in Section A. The currents 1 and 2 add constructively on the line wire, while the currents 3 and 4 add destructively on the neutral wire. In the depicted embodiment, the sum of the currents 1 and 2 is equal to the sum of the currents 3 and 4, and hence the current 5 reduces to zero. Although FIG. 4 depicts the current 5 being reduced to zero, embodiments do not necessarily reduce the common mode current through the ground path to zero. In some embodiments, the common mode current is limited to a value which limits electromagnetic emissions to a specified level. Also, FIG. 4 depicts an adjustment to the RMS currents on the line wire as well as neutral wire; however, the common mode current may be limited by only reducing the RMS current on either the line wire or the neutral wire (i.e., by utilizing either the line OFDM carrier weights 313, or the neutral OFDM carrier weights 315).

Figure 5A:
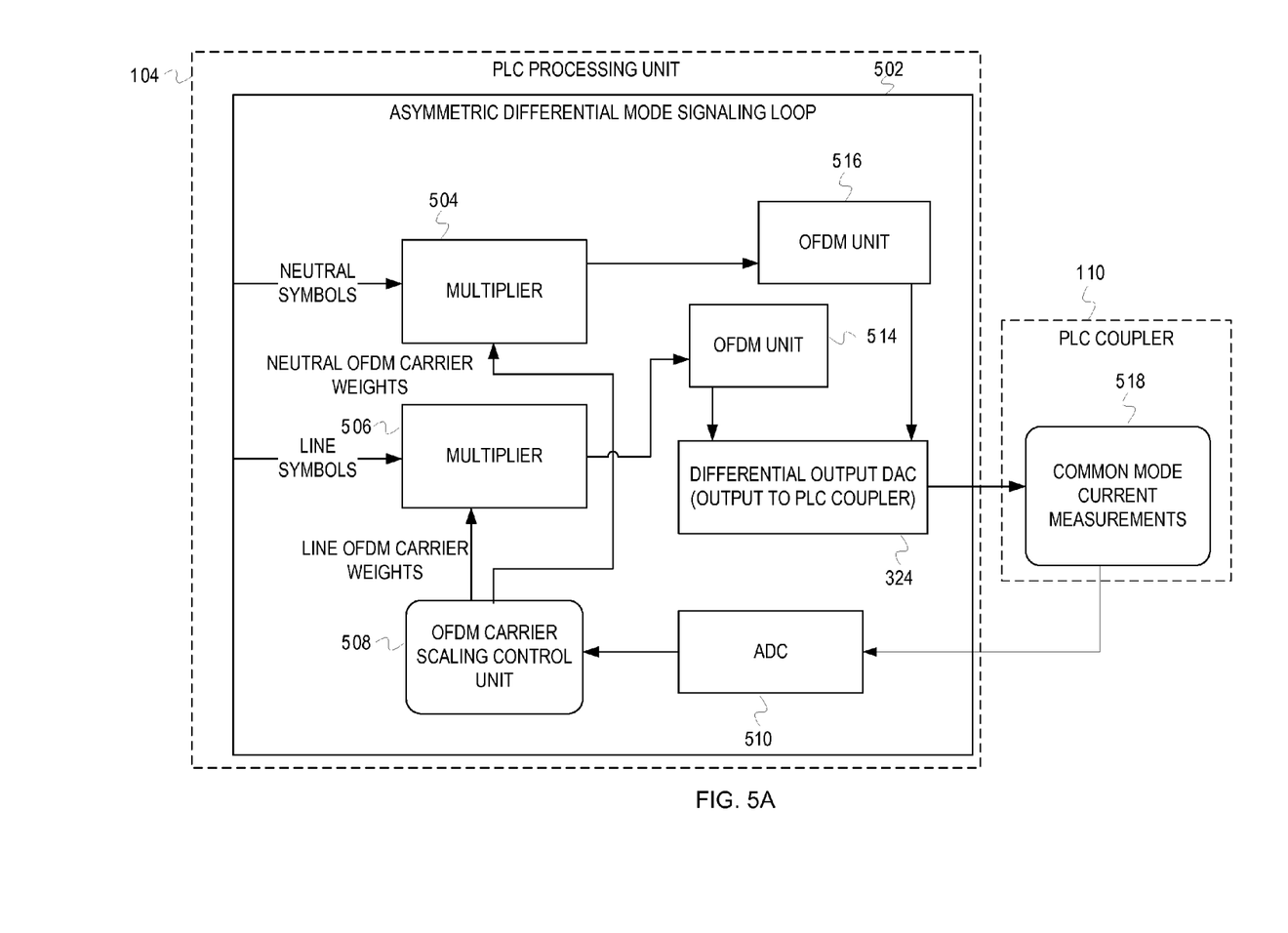
FIG. 5A depicts an example conceptual diagram of an asymmetric differential mode signaling control loop with a differential digital-to-analog converter to adjust transmit voltage levels in a PLC processing unit.

FIG. 5A depicts an example conceptual diagram of an asymmetric differential mode signaling control loop with a differential digital-to-analog converter to adjust transmit voltage levels in a PLC processing unit. FIG. 5A includes the PLC processing unit 104 and the PLC coupler 110 as described above with reference to FIG. 1. The PLC processing unit 104 includes an asymmetric differential mode signaling loop 502 having a multiplier 504, a multiplier 506, an OFDM carrier scaling control unit 508, an OFDM unit 514, an OFDM unit 516, an ADC 510 and the differential output DAC 324 (as described above with reference to FIG. 3). For simplification, FIG. 5A does not depict all components of the PLC processing unit 104 and the PLC coupler 110. The PLC coupler 110 includes common mode current measurements 518. The common mode current measurements 518 are obtained based on the common mode currents on the line and neutral wires in the PLC coupler 110. The common mode current measurements 518 may be obtained using a current probe, a digital common mode current meter (utilizing a digital non-inverting adder), etc. For example, the current probe may be located inside the PLC coupler 110 to measure common mode currents at line and neutral wires. In some implementations, when the common mode current probe has a large form factor, the common mode current probe may be located outside the PLC coupler 110.

In one implementation, the multiplier 506 may be a binary multiplier and receives line symbols and line OFDM carrier weights as inputs. Similarly, the multiplier 504 may be a binary multiplier and receives neutral symbols and neutral OFDM carrier weights as inputs. In some implementations, the multipliers 504 and 506 may be a part of the OFDM unit 516 and the OFDM unit 514, respectively. The line and neutral symbols include symbols modulated using a modulation technique (e.g., Quadrature Amplitude Modulation (QAM), etc.) for data to be transmitted over the line and neutral wires. The line and neutral OFDM carrier weights are values generated using the OFDM carrier scaling control unit 508. The OFDM carrier scaling control unit 508 may include program instructions to generate the line and neutral OFDM carrier weights. The line and neutral OFDM carrier weights when multiplied with the line symbols and the neutral symbols, respectively, adjust the transmit voltage levels in the PLC processing unit 104 to limit common mode currents below a threshold level, as will be further described below (e.g., as described at block 558 in FIG. 5B). The OFDM carrier scaling control unit 508 utilizes voltage samples of a common mode signal received from the ADC 510 to generate the line and neutral OFDM carrier weights. The ADC 510 receives the common mode signal from the common mode current measurements 518 via a feedback loop, and determines voltage samples for the common mode current signal. The common mode current measurements 518 are common mode current measurements for common mode currents on the line and neutral wires in the PLC coupler 110. The adjusted line and neutral symbols at the output of the multipliers 506 and 504 are fed to the OFDM unit 514 and the OFDM unit 516, respectively. The OFDM units 514 and 516 include one or more components (e.g., an inverse fast Fourier transform unit, a time domain windowing unit, etc.) to generate OFDM signals. The differential output DAC 324 receives the output of the OFDM units 514 and 516. The signals at the output of the OFDM units 514 and 516 have unequal RMS voltages. The differential output DAC 324 generates analog signals for the OFDM modulated line and neutral signals and drives the line and neutral signals on the line and neutral wires, respectively. The PLC coupler 110 receives the analog signals from the differential output DAC 324 for transmission on the line and neutral wires.

The OFDM carrier scaling control unit 508 generates the line and neutral OFDM carrier weights for each of the occupied carrier frequencies. In some implementations, the OFDM carrier scaling control unit 508 includes signal processing components to determine voltage samples for each of the carrier frequencies based on the voltage samples received from the ADC 510. For simplification, FIG. 5A only depicts a single multiplier for, the line symbols and a single multiplier for the neutral symbols, i.e the multipliers 506 and 504, respectively. However, multiple multipliers may be utilized for multiplying the line OFDM carrier weights with the line symbols for each of the carrier frequencies. Similarly, multiple multipliers may be utilized for multiplying the neutral OFDM carrier weights with the neutral symbols for each of the carrier frequencies.

The asymmetric differential mode signaling loop 502 described in FIG. 5A iteratively calculates the line and neutral OFDM carrier weights in real time to adjust the transmit voltage levels of the line and neutral signals at the output of the PLC processing unit 104. The asymmetric differential mode signaling loop 502 depicts one implementation of reducing transmit voltage levels of the signals driven by the differential output DAC 324. With iterative calculations of the line and neutral OFDM carrier weights, the asymmetric differential mode signaling loop 502 allows optimization of the line and neutral OFDM carrier weights to mitigate errors resulting from noise and variations in device performance due to environmental conditions.

It is noted that, in some implementations, the active common mode current limiter 102 may not necessarily utilize the line and neutral OFDM carrier weights calculated iteratively, but certain stored values of the line and neutral OFDM carrier weights. Also, the active common mode current limiter 102 may utilize average values of the line and neutral OFDM carrier weights previously determined by execution of the OFDM carrier scaling control unit 508.

Figure 5B:
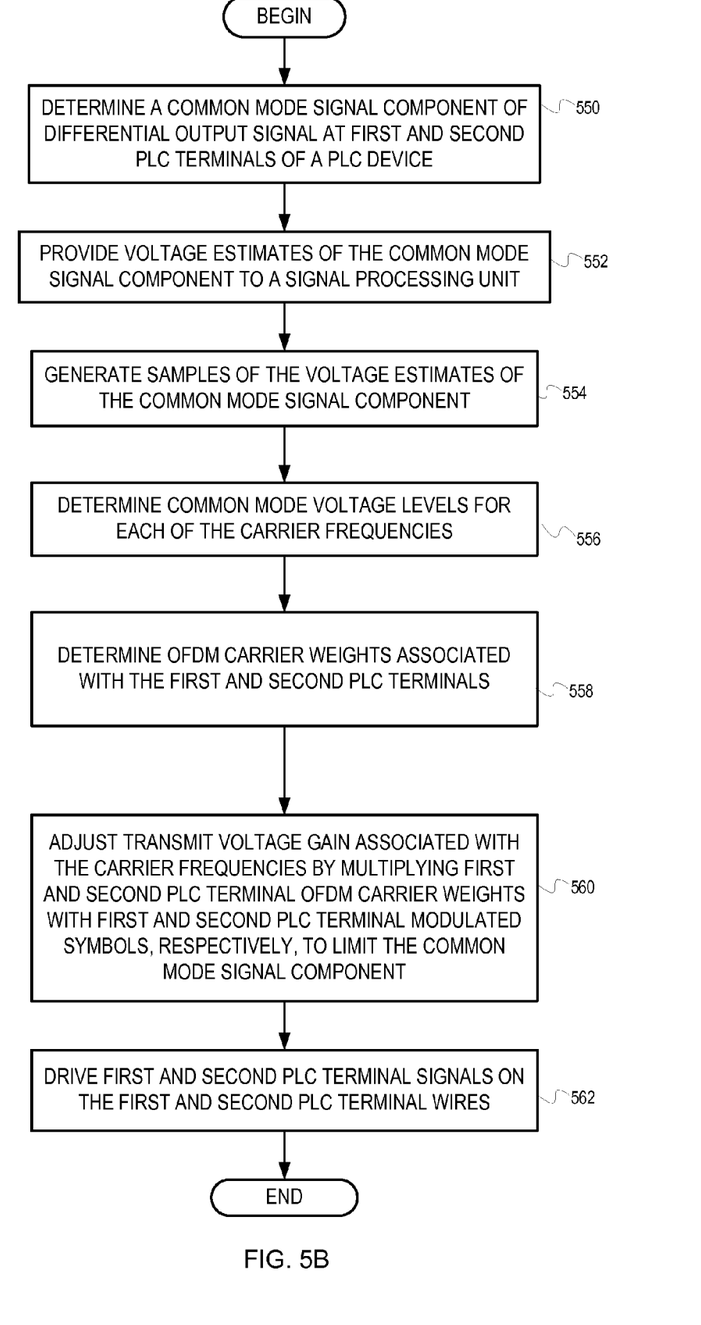
FIG. 5B illustrates a flow diagram of example operations to adjust transmit voltage levels using a differential signaling control loop.

FIG. 5B illustrates a flow diagram of example operations to adjust transmit voltage levels using an asymmetric differential signaling control loop of a PLC device. The flow begins at block 550.

At block 550, a common mode signal component associated with a differential output signal at first and second PLC terminals of a PLC device is determined. In one implementation, the PLC coupler 110 of the PLC device determines a common mode current signal component associated with the line and neutral terminals of the PLC coupler 110 using the feedback loop, as described above with reference to FIGS. 1 and 5A. The flow continues at block 552.

At block 552, voltage estimates of the common mode signal component are provided to a signal processing unit. In one implementation, the PLC coupler 110 provides voltage estimates of the common mode signal component to the ADC 510 in the PLC processing unit 104. For example, the PLC coupler 110 may provide the common mode current measurements 518 to the ADC 510 in the PLC processing unit 104. The flow continues at block 554.

At block 554, samples of the voltage estimates of the common mode signal component are generated. In one implementation, the ADC 510 generates samples of the voltage estimates of the common mode signal component received from the PLC coupler 110. The flow continues at block 556.

At block 556, common mode voltage levels are determined for each of the carrier frequencies. In one implementation, the OFDM carrier scaling control unit 508 of the PLC processing unit 104 determines the common mode voltage levels for each of the carrier frequencies utilized for communication. The flow continues at block 558.

At block 558, the OFDM carrier weights associated with the first and second PLC terminals are determined. In one implementation, the OFDM carrier scaling control unit 508 determines line OFDM carrier weights (associated with the first PLC terminal) and neutral OFDM carrier weights (associated with the second PLC terminal) for the carrier frequencies. In some implementations, the OFDM carrier scaling control unit 508 determines line OFDM carrier weights to increase or decrease a differential mode transmit voltage gain at the first PLC terminal for certain carrier frequencies. Similarly, the OFDM carrier scaling control unit 508 determines neutral OFDM carrier weights to increase or decrease the differential mode transmit voltage gain at the second PLC terminal. The OFDM carrier scaling control unit 208 may also determine line or neutral OFDM carrier weights such that the differential mode transmit voltage gain at the first or second PLC terminal, respectively, is not adjusted (i.e., the gain is maintained) for certain carrier frequencies. In one implementation, the OFDM carrier scaling control unit 508 determines the line and neutral OFDM carrier weights to maximize transmit power of OFDM signals at the first and second PLC terminals, while keeping common mode currents within a certain threshold limit (to limit electromagnetic emissions). After determining the OFDM carrier weights, the OFDM carrier scaling control unit 508 sends the line OFDM carrier weights to the multiplier 506 and the neutral OFDM carrier weights to the multiplier 504. The flow continues at block 560.

At block 560, transmit voltage gain associated with the carrier frequencies is adjusted by multiplying the first PLC terminal OFDM carrier weights with first PLC terminal OFDM symbols and the second PLC terminal OFDM carrier weights with second the PLC terminal OFDM symbols to limit the common mode signal component. In one implementation, the multiplier 506 multiplies the line OFDM carrier weights with the line OFDM symbols, and the neutral multiplier 504 multiplies the neutral OFDM carrier weights with the neutral OFDM symbols. The multiplier 506 sends the output (adjusted line symbols) to the OFDM unit 514, and the multiplier 504 sends the output (adjusted neutral symbols) to the OFDM unit 516 in order to perform OFDM operations. The flow continues at block 562.

At block 562, first and second PLC terminal signals are driven on the first and second PLC terminal wires. In one implementation, the differential output DAC 324 drives the line and neutral signals on the line and neutral wires, respectively, to provide the adjusted signals to the line and neutral terminals of the PLC coupler 110. After block 562, the flow ends.

Figure 6:
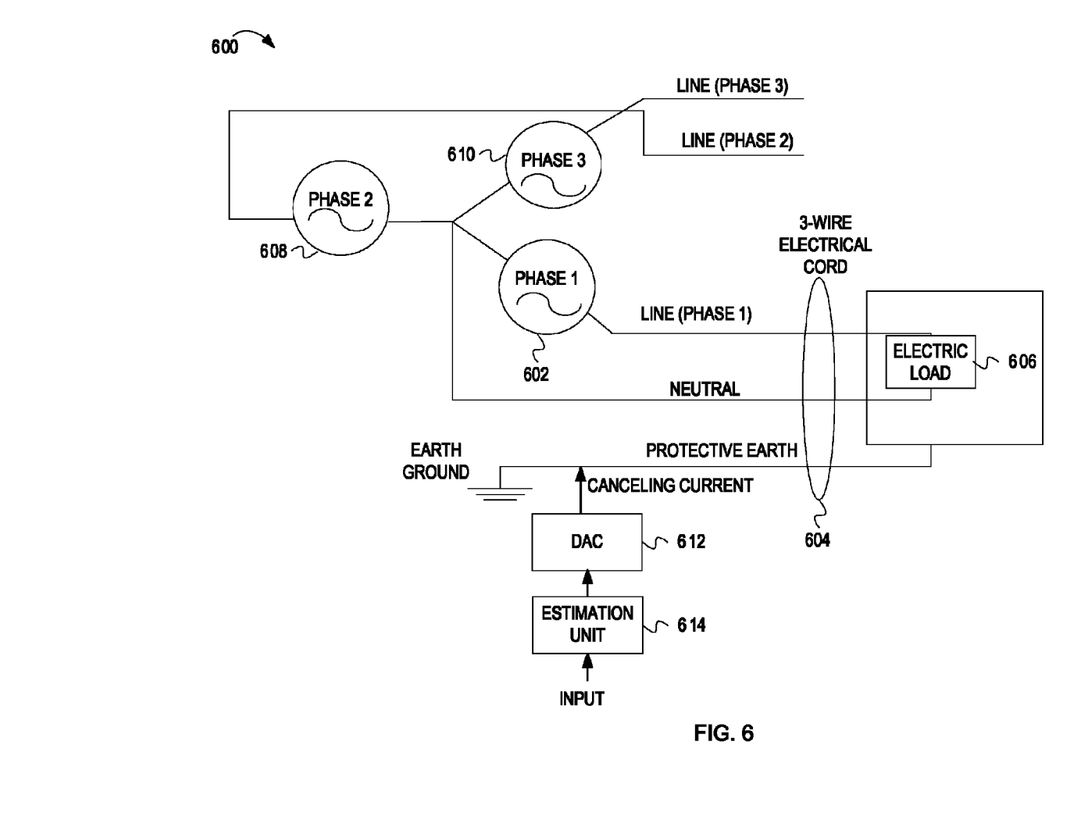
FIG. 6 depicts an example conceptual diagram of limiting common mode currents by injecting a canceling current into a protective earth wire in a 3-wire electrical cord.

FIG. 6 depicts an example conceptual diagram of limiting common mode currents by injecting a canceling current into a protective earth wire in a 3-wire electrical cord. FIG. 6 depicts a 3-wire electrical installation 600. The 3-wire electrical installation 600 includes a phase 1 alternating current (AC) supply 602, a phase 2 AC supply 608, and a phase 3 AC supply 610, an electric load 606, a 3-wire electrical cord 604, an estimation unit 614 and a DAC 612. The electric load 606 (e.g., a smart appliance, a television, computer, PLC system, etc.) is coupled to the AC supply 602 via the 3-wire electric cord 604. The 3-wire electrical cord 604 includes a line wire (from the AC supply 602), a neutral wire and a protective earth wire. Typically, a 2-wire PLC system transmits signals on the line and neutral wires. However, the PLC system can couple an independent high frequency signal into the protective earth wire as well. The estimation unit 614 can determine and inject a small amount of current (i.e., canceling current) into the protective earth wire (i.e., one of the wires that is not being utilized for powerline communication) to neutralize the effect of the common mode currents. In some implementations, the estimation unit 614 determines the canceling current based on an input signal. The input may be a digitized estimate of the net common mode current through the 3-wire electrical cord. The DAC 612 receives an input from the estimation unit 614, and injects the specified amount of current into the protective earth wire. The estimation unit 614 estimates a net common mode current associated with each carrier frequency, and determines a carrier frequency dependent cancelling current, based on the estimates of the common mode current, to be injected into the protective earth wire. The estimation unit 614 includes one or more hardware and software components to determine the canceling current based on the permissible electromagnetic emission levels due to common mode currents.

In some implementations, the neutral and protective earth wires may be physically connected for safety reasons. Typically, the connection between the neutral wire and the protective earth wire is at a significant distance from transmitting and receiving PLC devices. It is noted that the changes to the power line impedances in the high frequency model for transmission power lines are localized and the protective earth wire can be utilized to transmit small amounts of high frequency electrical currents. It is also noted that the small amounts of high frequency electrical currents do not affect the electrical circuit breakers coupled to the protective earth wire.

Although FIGS. 1-6 include techniques for limiting common mode currents on line and neutral wires; however embodiments are not so limited. In other embodiments, the techniques described in FIGS. 1-6 may be utilized for limiting common mode currents on one or more powerline communication channels (e.g., a Line-Neutral communication channel, a Line-Protective Earth communication channel, a Neutral-Protective Earth communication channel, etc.). Also, it is noted that in other embodiments the techniques described in FIGS. 1-6 may be implemented in a powerline communication medium having three or more wires (e.g., a four wire powerline communication medium).

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
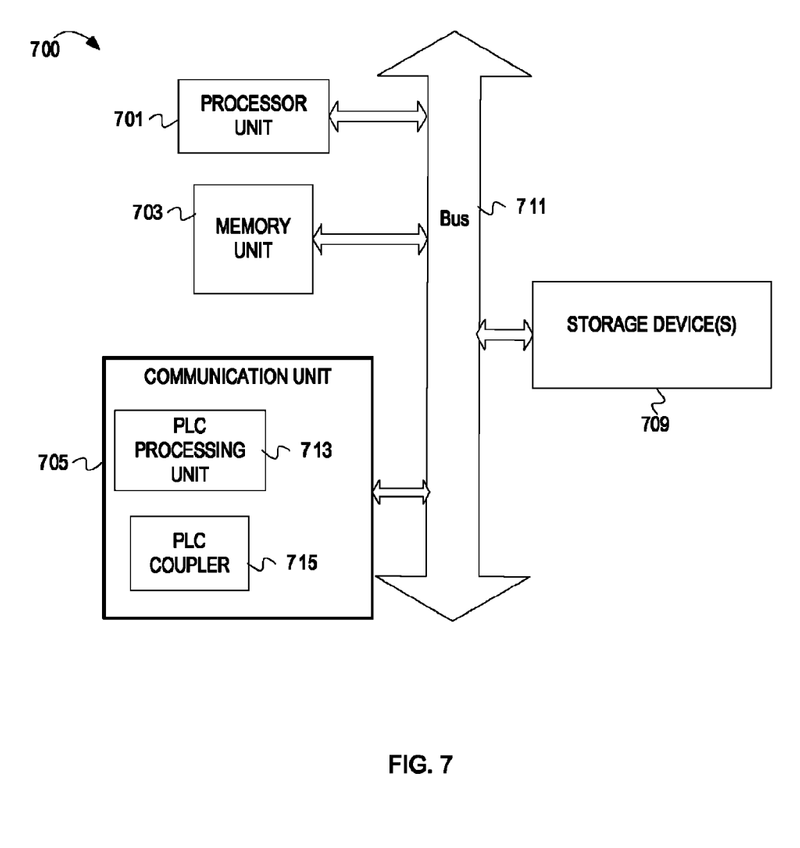
FIG. 7 depicts an example PLC device.

FIG. 7 depicts an example network device 700. In some implementations, the network device 700 may be a PLC device based on one or more of the PLC standards (e.g., HomePlug AV, HomePlug AV2, etc.). For example, the network device 700 may be a desktop computer, digital video recorder (DVR), a television, a smart appliance, etc. with PLC capabilities, or the network device 700 may be a PLC plug-in module or other standalone PLC device. The network device 700 includes a processor unit 701 (possibly including multiple processors, multiple cores, multiple nodes, and/or implementing multi-threading, etc.). The network device 700 includes memory unit 703. The memory unit 703 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or one or more of the above already described possible realizations of machine-readable media. The network device 700 also includes a bus 711 (e.g., PCI, PCI-Express, AHB™, AXI™, NoC, etc.), a communication unit 705, and a storage device(s) 709 (e.g., optical storage, magnetic storage, network attached storage, etc.). The communication unit 705 may include one or more hardware and software components to allow powerline communication between the network device 700 and one or more network devices. The communication unit 705 may be partially (or entirely) implemented in one or more integrated circuits (e.g., one or more application specific integrated circuit), or may be implemented in one or more circuit boards in a single device or in two separate devices. The communication unit 705 also includes a PLC processing unit 713 and a PLC coupler 715. The PLC processing unit 713 includes one or more components to adjust transmit voltage levels in OFDM signals for limiting common mode currents. The PLC coupler 715 includes one or more components to measure common mode currents on electrical wires and supply them to the PLC processing unit 713. The PLC processing unit 713 and the PLC coupler 715 facilitate limiting the common mode currents, as described above with reference to FIGS. 1-6. One or more of these functionalities may be partially (or entirely) implemented in hardware or an application specific integrated circuit. Further, realizations may include fewer or additional components not illustrated in FIG. 7 (e.g., video cards, audio cards, additional network interfaces, peripheral devices, etc.). The processor unit 701, the storage device(s) 709, and the communication unit 705 are coupled to the bus 711. Although illustrated as being coupled to the bus 711, the memory unit 703 may be coupled to the processor unit 701.

While the embodiments are described with reference to various implementations and exploitations, it will be understood that these embodiments are illustrative and that the scope of the inventive subject matter is not limited to them. In general, techniques for limiting common mode currents in a PLC device as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for limiting a common mode signal component of a powerline communication device, comprising:
   determining, using a feedback loop of the powerline communication device, a common mode signal component of an output signal of the powerline communication device;

providing, via the feedback loop, voltage estimates of the common mode signal component to a signal processing unit of the powerline communication device;

generating samples of the voltage estimates using an analog-to-digital converter of the signal processing unit, in response to the signal processing unit receiving the voltage estimates; and adjusting a transmit voltage of the powerline communication device based, at least in part, on the samples of the voltage estimates, wherein said adjusting comprises, determining a common mode voltage level of a carrier frequency associated with the samples; and adjusting a differential mode voltage gain associated with the carrier frequency to maintain the common mode signal component below a threshold limit.

2. The method of claim 1, wherein said determining the common mode signal component of the output signal comprises:

providing the output signal to a common mode choke on the feedback loop; and generating the common mode signal component of the output signal using the common mode choke.

3. The method of claim 1, wherein said adjusting the transmit voltage of the powerline communication device comprises:

determining a common mode voltage level of the carrier frequency;

determining an orthogonal frequency-division multiplexing (OFDM) carrier weight for the carrier frequency based, at least in part, on the common mode voltage level; and adjusting a differential mode voltage gain associated with the carrier frequency, wherein said adjusting the differential mode voltage gain comprises multiplying a modulated symbol with the OFDM carrier weight.

4. The method of claim 3, wherein the carrier frequency is an OFDM carrier associated with the samples.

5. The method of claim 1, wherein said providing, via the feedback loop, the voltage estimates comprises providing, via a feedback loop of a powerline coupler, the voltage estimates from the powerline coupler to the signal processing unit.

6. A method for limiting a common mode signal component of a powerline communication device, comprising:

determining estimates of a common mode current of a differential output signal at first and second terminals of the powerline communication device, wherein the common mode current is associated with a carrier frequency;

determining a first frequency dependent carrier weight and a second frequency dependent carrier weight for the carrier frequency based, at least in part, on the estimates; and adjusting a transmit voltage associated with the differential output signal, wherein said adjusting the transmit voltage comprises applying the first frequency dependent carrier weight and the second frequency dependent carrier weight to the carrier frequency.

7. The method of claim 6, wherein said adjusting the transmit voltage comprises:

adjusting a first root mean square (RMS) voltage of a first signal at the first terminal using the first frequency dependent carrier weight; and adjusting a second RMS voltage of a second signal at the second terminal using the second frequency dependent carrier weight.

8. The method of claim 7, further comprising:

providing a first current on the first terminal based on the first RMS voltage;

providing a second current on the second terminal based on the second RMS voltage, wherein the first current is different from the second current; and differentially driving the first current on the first terminal and the second current on the second terminal to a powerline communication coupler of the powerline communication device using a differential digital-to-analog converter (DAC).

9. The method of claim 7, wherein:

the first frequency dependent carrier weight is a first orthogonal frequency-division multiplexing (OFDM) carrier weight, and the second frequency dependent carrier weight is a second OFDM carrier weight;

said adjusting the first RMS voltage comprises multiplying a first terminal modulated symbol with the first OFDM carrier weight; and said adjusting the second RMS voltage comprises multiplying a second terminal modulated symbol with the second OFDM carrier weight.

10. The method of claim 6, wherein the first frequency dependent carrier weight and the second frequency dependent carrier weight are determined by a carrier scaling control unit using real-time measurements of the common mode current.

11. The method of claim 6, wherein said determining the estimates of the common mode current comprises, receiving, at a signal processing unit of the powerline communication device, the estimates of the common mode current from a powerline coupler of the powerline communication device, and generating samples of the estimates using an analog-to-digital converter of the signal processing unit.

12. The method of claim 6, further comprising amplifying the common mode current at the first and second terminals to adjust the estimates of the common mode current.

13. The method of claim 6, further comprising utilizing a calibration table to account for limitations of a common mode current measuring device to adjust the estimates of the common mode current.

14. The method of claim 6, wherein the first and second terminals of the powerline communication device comprise a line terminal wire and a neutral terminal wire, respectively, of the powerline communication device.

15. The method of claim 6, wherein the first and second terminals of the powerline communication device comprise a line terminal wire and a protective earth terminal wire, respectively, of the powerline communication device.

16. A network device comprising:

a powerline communication (PLC) coupler operable to:

determine, using a feedback loop of the network device, a common mode signal component of an output signal of the network device, wherein said determining the common mode signal comprises, providing the output signal to a common mode choke on the feedback loop; and generating the common mode signal component using the common mode choke;

provide, via the feedback loop, voltage estimates of the common mode signal component to a PLC processing unit of the network device; and the PLC processing unit operable to, generate samples of the voltage estimates of the common mode signal component using an analog-to-digital converter of the PLC processing unit, in response to receiving the voltage estimates; and adjust a transmit voltage of the network device based, at least in part, on the samples of the voltage estimates.

17. The network device of claim 16, wherein the PLC processing unit operable to adjust the transmit voltage of the network device comprises the PLC processing unit operable to:
  determine a common mode voltage level of a carrier frequency associated with the samples of the voltage estimates; and
  adjust a differential mode voltage gain associated with the carrier frequency to maintain the common mode signal component below a threshold limit.

18. The network device of claim 16, wherein the PLC processing unit operable to adjust the transmit voltage comprises the PLC processing unit operable to:
  determine a common mode voltage level of a carrier frequency associated with the samples of the voltage estimates;
  determine an orthogonal frequency-division multiplexing (OFDM) carrier weight for the carrier frequency based on the common mode voltage level of the carrier frequency; and
  adjust a differential mode voltage gain associated with the carrier frequency, wherein the PLC processing unit operable to adjust the differential mode voltage gain comprises the PLC processing unit operable to multiply a modulated symbol with the OFDM carrier weight.

19. The network device of claim 16, wherein the PLC coupler operable to provide, via the feedback loop, the voltage estimates of the common mode signal component comprises the PLC coupler operable to provide, via a feedback loop of a powerline coupler, the voltage estimates from the PLC coupler to an analog-to-digital converter of the PLC processing unit.

20. A network device comprising:
  a memory unit; and
  a powerline communication (PLC) processing unit operable to,
    determine estimates of a common mode current of a differential output signal at first and second terminals of the network device, wherein the estimates are associated with a carrier frequency;
    determine a first frequency dependent carrier weight and a second frequency dependent carrier weight for the carrier frequency based, at least in part, on the estimates of the common mode current; and
    adjust a transmit voltage associated with the differential output signal, wherein
      the PLC processing unit operable to adjust the transmit voltage comprises the PLC processing unit further operable to apply the first frequency dependent carrier weight and the second frequency dependent carrier weight to the carrier frequency.

21. The network device of claim 20, wherein the PLC processing unit operable to adjust the transmit voltage is further operable to:
  adjust a first root mean square (RMS) voltage of a first signal at the first terminal using the first frequency dependent carrier weight; and
  adjust a second RMS voltage of a second signal at the second terminal using the second frequency dependent carrier weight.

22. The network device of claim 21, wherein the PLC processing unit is further operable to:
  provide a first current on the first terminal based on the first RMS voltage;
  provide a second current on the second terminal based on the second RMS voltage, wherein the first current is different from the second current; and
  differentially drive the first current on the first terminal and the second current on the second terminal to a PLC coupler of the network device using a differential digital-to-analog converter (DAC).

23. The network device of claim 21, wherein:
  the first frequency dependent carrier weight is a first orthogonal frequency-division multiplexing (OFDM) carrier weight, and the second frequency dependent carrier weight is a second OFDM carrier weight;
  the PLC processing unit operable to adjust the first RMS voltage comprises the PLC processing unit operable to multiply a first terminal modulated symbol with the first OFDM carrier weight; and
  the PLC processing unit operable to adjust the second RMS voltage comprises the PLC processing unit operable to multiply a second terminal modulated symbol with the second OFDM carrier weight.

24. The network device of claim 20, wherein the PLC processing unit comprises a carrier scaling control unit operable to determine the first frequency dependent carrier weight and the second frequency dependent carrier weight using real-time measurements of the common mode current.

25. The network device of claim 20, wherein the PLC processing unit operable to determine the estimates of the common mode current comprises the PLC processing unit operable to,
  receive, at a signal processing unit of the network device, the estimates of the common mode current from a PLC coupler of the network device, and
  generate samples of the estimates using an analog-to-digital converter of the PLC processing unit.

26. The network device of claim 20, wherein the first and second terminals of the network device comprise a line terminal wire and a neutral terminal wire, respectively, of the network device.

27. The network device of claim 20, wherein the first and second terminals of the network device comprise a line terminal wire and a protective earth terminal wire, respectively, of the network device.

28. A method comprising:
  determining a carrier frequency dependent current to inject into a wire of a powerline communication medium that is not being utilized for powerline communications; and
  injecting the carrier frequency dependent current into the wire to limit a net common mode current.

29. The method of claim 28, wherein the powerline communication medium comprises a three wire powerline communication medium or a four wire powerline communication medium.

30. The method of claim 28, wherein the wire of the powerline communication medium that is not being utilized for powerline communications comprises a protective earth wire of the powerline communication medium.

31. The method of claim 28, further comprising:
  determining an estimate of a net common mode current associated with a carrier frequency for the powerline communication medium, wherein said determining the carrier frequency dependent current is based, at least in part, on the estimate of the net common mode current.

* * * * *